E. J. McMILLAN.
WIND DEFLECTOR AND LOOKOUT.
APPLICATION FILED OCT. 5, 1914.
1,164,374. Patented Dec. 14, 1915.
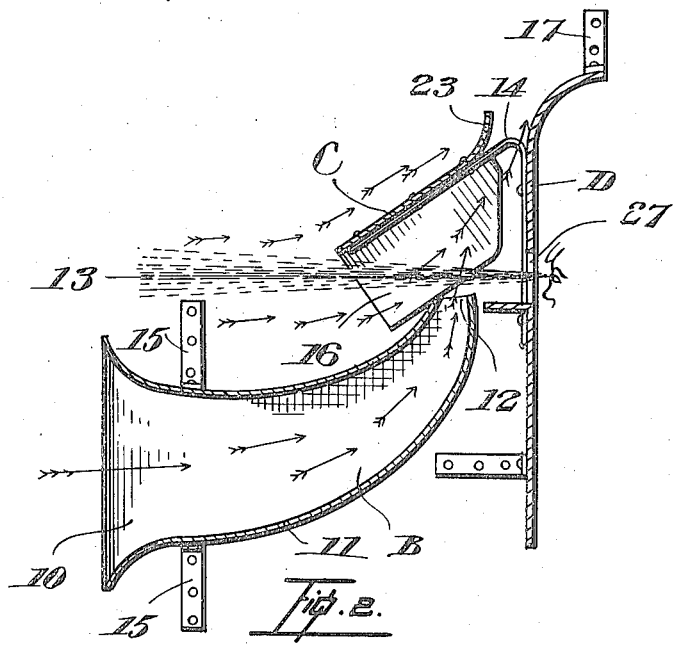
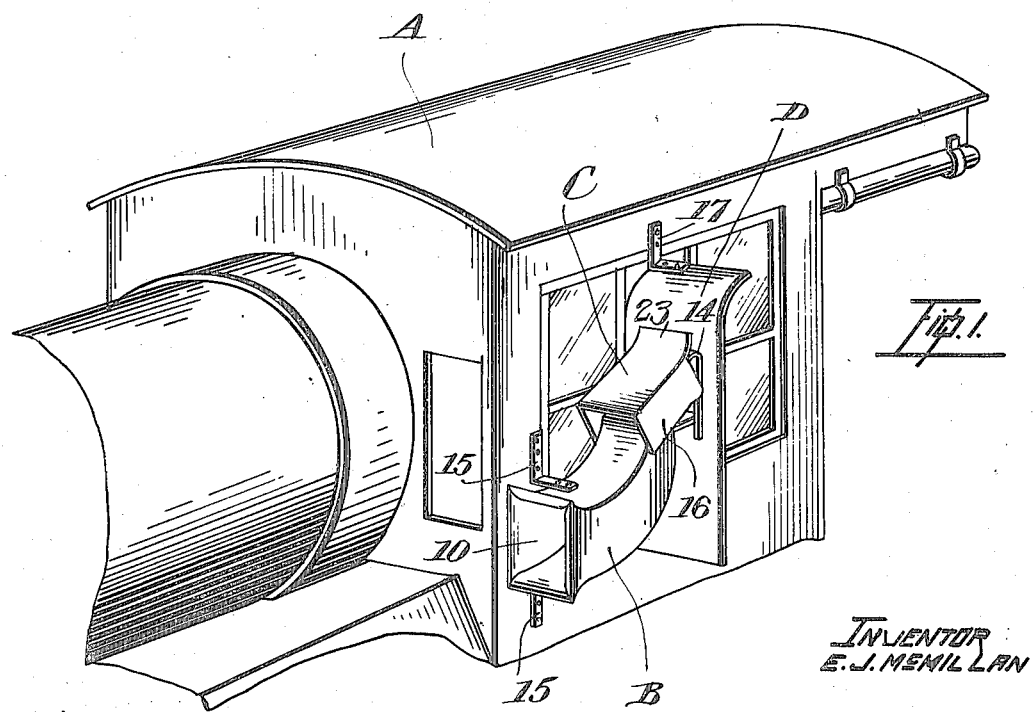

UNITED STATES PATENT OFFICE.

ERNEST JAMES McMILLAN, OF MOOSE JAW, SASKATCHEWAN, CANADA.

WIND-DEFLECTOR AND LOOKOUT.

1,164,374.   Specification of Letters Patent.   Patented Dec. 14, 1915.

Application filed October 5, 1914.   Serial No. 865,148.

*To all whom it may concern:*

Be it known that I, ERNEST JAMES MC-MILLAN, a subject of the King of Great Britain, and resident of Moose Jaw, in the Province of Saskatchewan, Dominion of Canada, have invented certain new and useful Improvements in Wind-Deflectors and Lookouts, of which the following is the specification.

This invention relates to improvements in wind deflectors and lookouts to be used on moving vehicles, such as locomotives, engines, electric cars, steam boats, motor vehicles and the like, and the object of the invention is to deflect the current of air moving past the vehicle to enable the operator or occupant to maintain a clear view in advance of the moving body without being subjected to the wind blast usually experienced, and it consists essentially of means for forming an auxiliary deflecting current of air and causing it to impinge upon and deflect the main current away from the line of vision, all as hereinafter more fully set forth and described in the accompanying specification and drawing.

In the drawings, Figure 1 is a perspective view of an embodiment of the invention. Fig. 2 is a sectional view through the same.

In the drawings like characters of reference indicate corresponding parts in all the figures.

Referring to the drawing, A represents a locomotive cab which is shown for the sake of illustration only and the invention, as will be seen from its nature, may be applied to any rapidly moving vehicle on land or sea.

The invention comprises means for producing a deflecting current of air and causing it to traverse the line of vision to thereby deflect the main current. The means which I have shown comprise a funnel member B which has a large flaring mouth 10 opening in a forward direction and is formed with walls 11 which gradually converge to a discharge orifice 12, the funnel member being curved gradually from the inlet to outlet whereby the outlet discharges transversely of the line of vision 13.

Immediately above the line of vision, a second deflector C is provided adapted to deflect the air currents above the line of vision in an upward direction. This deflector in the embodiment illustrated, is in the form of an inclined plate having an upwardly curved upper edge 23. The current of air produced by the combination of the auxiliary current coming through the funnel member B and the main current along the line of vision causes a vacuum or suction beneath for the purpose of drawing away and discharging the air currents between the deflector C and the back wall D, the upper part of which also serves as a deflector. This vacuum or suction will thus operate on the side of the line of vision opposite to that from which the deflecting current comes.

The deflectors and funnel member may be supported in position by any suitable means. I have shown brackets 14 connecting the deflector C with the deflector D and brackets 15 supporting the funnel member from a fixed support such as the cab. A bracket 17 may also lead from the bracket D to the fixed support and the deflector C may be provided with side wings 16 extending downwardly and adapted to protect against side currents of air.

In the embodiment illustrated, the deflector D is extended downwardly below the line of vision and a lookout opening 27 is formed therein through which a view may be taken.

It will be seen that the line of vision is clear and unobstructed and a view may be taken along the same while a person taking the view will not be subjected to any air current or other disturbance. This is of a special importance in cold weather inasmuch as the velocity of the deflecting current will vary with the velocity of the moving vehicle, it will remain in constant proportion to the main current and consequently will serve to deflect it at a constant and predetermined angle.

In the embodiment illustrated, I have shown the deflector attached to the side of the cab of a locomotive, the engineer of which would lean out the window and look through the deflector, but it is obvious that it might be placed in any other suitable or convenient position for use.

As many changes could be made in the above construction and many apparently widely different embodiments of my invention, within the scope of the claims, constructed without departing from the spirit or scope thereof, it is intended that all matter contained in the accompanying specification and drawings shall be interpreted as illustrative and not in a limiting sense.

What I claim as my invention is:

A wind deflector and lookout comprising a vertical plate having an opening therein to permit vision therethrough, an inclined hood secured to said plate above the line of vision through said opening but spaced apart from said plate adapted to deflect the air currents above the line of vision upwardly, and a curved funnel member below the line of vision adapted to receive the air currents therebelow and direct them upwardly across the line of vision into said inclined hood whereby an injector action is formed therein and the current of air in the line of vision is deflected upwardly.

In witness whereof I have hereunto set my hand in the presence of two witnesses.

ERNEST JAMES McMILLAN.

Witnesses:
RUSSELL S. SMART,
PEARLE GARROW.